US008250656B2

(12) United States Patent
Vlasov

(10) Patent No.: US 8,250,656 B2
(45) Date of Patent: Aug. 21, 2012

(54) PROCESSOR WITH EXCLUDABLE INSTRUCTIONS AND REGISTERS AND CHANGEABLE INSTRUCTION CODING FOR ANTIVIRUS PROTECTION

(75) Inventor: Mikhail Y. Vlasov, Irvine, CA (US)

(73) Assignee: Mikhail Y. Vlasov, Lake Forest, CA (US)

( * ) Notice: Subject to any disclaimer, the term of this patent is extended or adjusted under 35 U.S.C. 154(b) by 1134 days.

(21) Appl. No.: 11/986,064

(22) Filed: Nov. 21, 2007

(65) Prior Publication Data

US 2009/0132795 A1    May 21, 2009

(51) Int. Cl.
*H04L 29/06* (2006.01)
(52) U.S. Cl. .............. 726/24; 726/26; 712/1; 712/226
(58) Field of Classification Search .............. 712/1, 226; 726/23–27
See application file for complete search history.

(56) References Cited

U.S. PATENT DOCUMENTS

| | | | | |
|---|---|---|---|---|
| 5,177,679 A | * | 1/1993 | Baxter | 712/36 |
| 5,729,760 A | * | 3/1998 | Poisner | 710/3 |
| 5,813,045 A | * | 9/1998 | Mahalingaiah et al. | 711/204 |
| 5,832,273 A | * | 11/1998 | Mizuse | 717/154 |
| 6,539,502 B1 | * | 3/2003 | Davidson et al. | 714/47.1 |
| 7,496,656 B2 | * | 2/2009 | Haydock | 709/224 |
| 2002/0038428 A1 | * | 3/2002 | Safa | 713/187 |
| 2002/0072893 A1 | * | 6/2002 | Wilson | 703/26 |
| 2003/0088864 A1 | * | 5/2003 | Tirumalai et al. | 717/160 |
| 2003/0121010 A1 | * | 6/2003 | Aubury | 716/4 |
| 2004/0250231 A1 | * | 12/2004 | Killian et al. | 716/18 |
| 2007/0055872 A1 | * | 3/2007 | Soga et al. | 713/168 |

OTHER PUBLICATIONS

Kc et al. "Countering Code-Injection Attacks With Instruction-Set Randomization", Proceedings of the 10th ACM Conference on Computer and Communications Security (CCS), pp. 272-280, Oct. 2003.*

\* cited by examiner

*Primary Examiner* — Hadi Armouche
(74) *Attorney, Agent, or Firm* — Mikhail Y. Vlasov

(57) ABSTRACT

Digital processor architecture is characterized by processor's instruction set and registers. If architecture is fixed and known to software developers the viruses may be created to harm computers. Invented processor architecture protects against viruses by modifying of association between instruction set coding and processor's functions. Additionally, invented architecture allows to exclude processor's parts associated with unused by program instructions and exclude registers. Exclusion of processor's parts unused by program makes processor smaller and faster in comparison with processor containing all blocks. Developed architecture also allows to exclude unused portions of instructions from instruction's format resulting in smaller memory size required for the same program.

1 Claim, 4 Drawing Sheets

PROCESSOR WITH EXCLUDABLE INSTRUCTIONS AND REGISTERS AND CHANGEABLE INSTRUCTION CODING FOR ANTIVIRUS PROTECTION

BACKGROUND OF THE INVENTION

Digital processor architecture is characterized by processor's instruction sets and registers. Existing processors have fixed set of instructions and static amount of registers.

Because processor's architecture is fixed and known to software developers the program viruses may be created to harm and compromise computer's usage. Vulnerability of computers to program viruses is a world problem with financial and operational losses.

Additionally, processors with unchangeable architectures may have excessive parts for a particular application program because some instructions and registers may not be involved by application program. Therefore processor's blocks associated with unused instructions and unused registers become idle. These idle blocks consume area of processor's chip and make processor slower in respect to otherwise similar processor with instruction decoder without unused instructions and register block without unused registers. Similar, excessive hardware may exist in particular application associated with unused interrupts, exceptions, direct memory access, input/output space.

Moreover, some bit portion of certain instruction may not be active for particular application program. For example, processors may reserve 24 bits in instruction's format for addressing despite the usage of processor in 16 address bits system. Not all memory range might be needed for a particular program. In existing processors with both Complex Instruction Set Computer (CISC) architecture and Reduced Instruction Set Computer (RISC) architecture unused bit fields are not eliminated from instruction's format.

Unused bit fields may lead to instructions being longer than it is necessary for simpler applications. Program with longer instructions requires more memory. Even one idle bit in instruction multiplied by number of occurrences of instruction in program may result in significant amount of occupied memory which is not used by program's algorithm.

BRIEF SUMMARY OF THE INVENTION

The invention provides an architecture of digital processor which allows to exclude instructions from processor's instruction set and exclude portions of instructions and registers which are not used by program.

Invented architecture allows to change instruction codes to protect computer from execution of program viruses. For example, if instruction is 8 bit wide the total number of different instruction codes is $2^8=256$. However, these 256 instruction codes may be assigned with 256! ($8.578*10^{506}$) variants of association to 256 different processor's functions.

In general case, if number of instructions (objects or symbols in permutation theory) is n they may be associated with n processor's functions (rearranged) by $n!=1*2*3* \ldots * (n-1)*n$ different ways.

If outsiders (including program virus developers) do not know which variant of association is used between instruction codes and processor's functions, their virus has negligible chance to be executed correctly on a processor with invented architecture.

Since invented architecture gives a possibility to change instruction codes, exclude parts of instruction decoder, some or all general purpose registers, interrupts, exceptions, input/output space, direct memory access and testability registers and allows to diminish memory address width, program counter and stack pointer width, input/output address width, input/output data width there are several advantages of the invented processor's architecture. They are:

protection against program viruses because of uniqueness of instruction set contents and coding (one in n! variants, where n is number of instructions) and different variants of register usage (total number of variants is $m!/(m-r)!$, where m is maximum number of registers in processor and r is number of used registers in processor);

smaller area of integrated circuit is needed for processors with excluded unused blocks compared to processors with all instructions and registers;

higher speed of processor with excluded blocks due to smaller timing delays in remaining blocks;

less required memory for exactly the same algorithm due to eliminations of unused portions of instructions from its format. Instructions become shorter bitwise.

Figure 1:
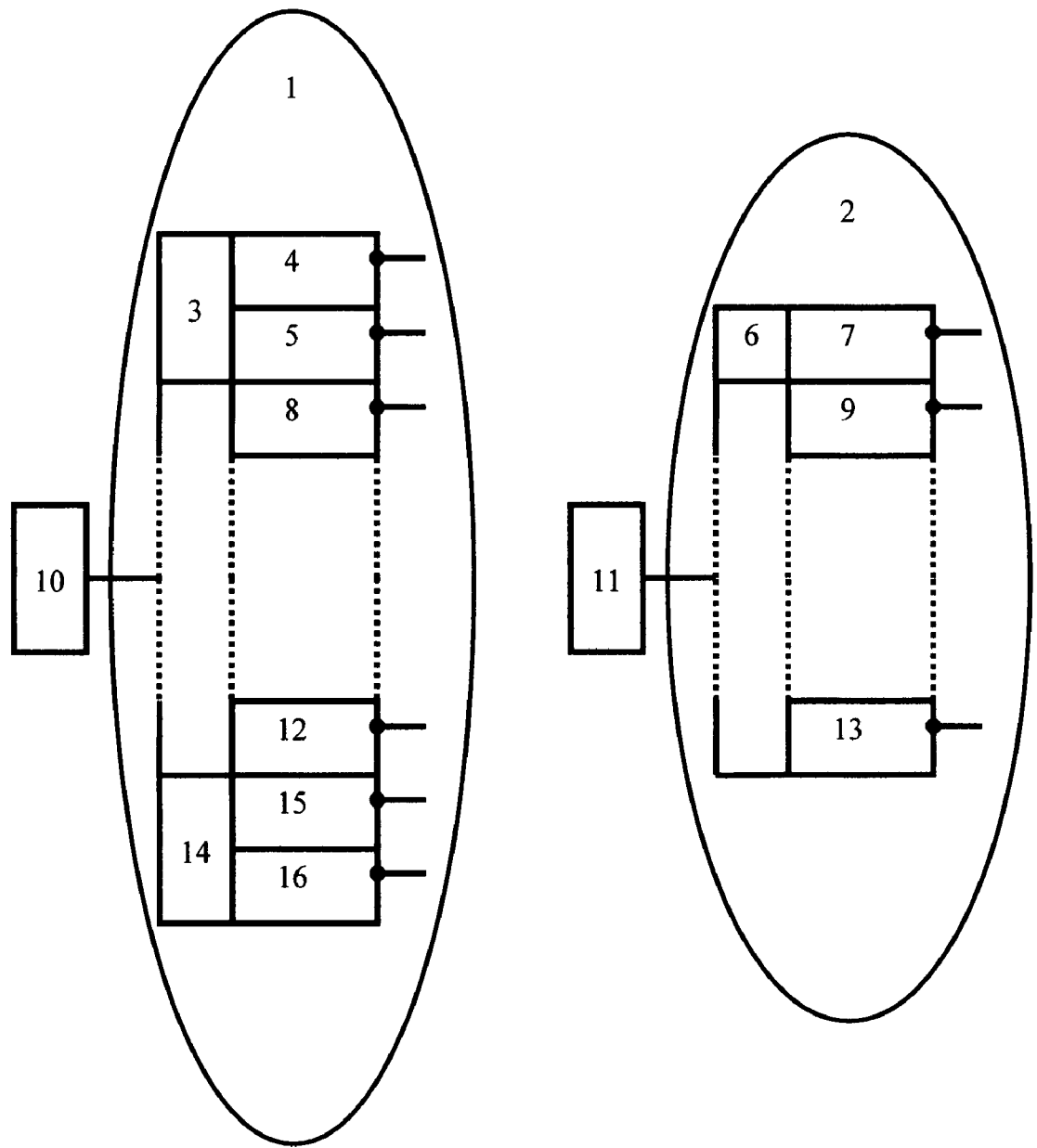
FIG. 1 contains simplified block diagrams of processor's instruction decoder 1 with all instructions decoded and instruction decoder 2 with some instructions excluded. Item 10 represents a current instruction which goes to preliminary decoders 3, 14 and final decoders 4, 5, 8, 12, 15, 16 individual for each instruction. Item 11 represents a current instruction which goes to preliminary decoder 6 and final decoders 7, 9, 13 individual for each instruction remaining after exclusion.

Invented processor's architecture allows to exclude unused instructions and associates with them blocks in instruction decoder. For example, instructions decoded by final decoders 5, 15, 16 may be not used in particular application. Therefore blocks 5, 15, 16 may be excluded in instruction decoder 2. Correspondence of the blocks in instruction decoder 1 and instruction decoder 2 is as follows:

| | | |
|---|---|---|
| 3 | > | 6 |
| 4 | > | 7 |
| 5 | > | excluded |
| 8 | > | 9 |
| 12 | > | 13 |
| 14 | > | excluded |
| 15 | > | excluded |
| 16 | > | excluded |

Note, that preliminary decoder 6 is smaller than preliminary decoder 3 because preliminary decoder 6 needs to decode only one instruction associated with block 7 while preliminary decoder 3 decodes for two instructions associated with blocks 4 and 5. Further, preliminary decoder 14 is excluded completely because blocks 15 and 16 have been excluded.

FIG. 1 depicts the difference in sizes of bigger decoder 1 with all instructions and smaller decoder 2 with some instructions excluded. The area of processor will be smaller with instruction decoder 2 and the performance will be higher because of less delays in instruction decoder 2 in comparison with processor containing instruction decoder 1.

Figure 2:
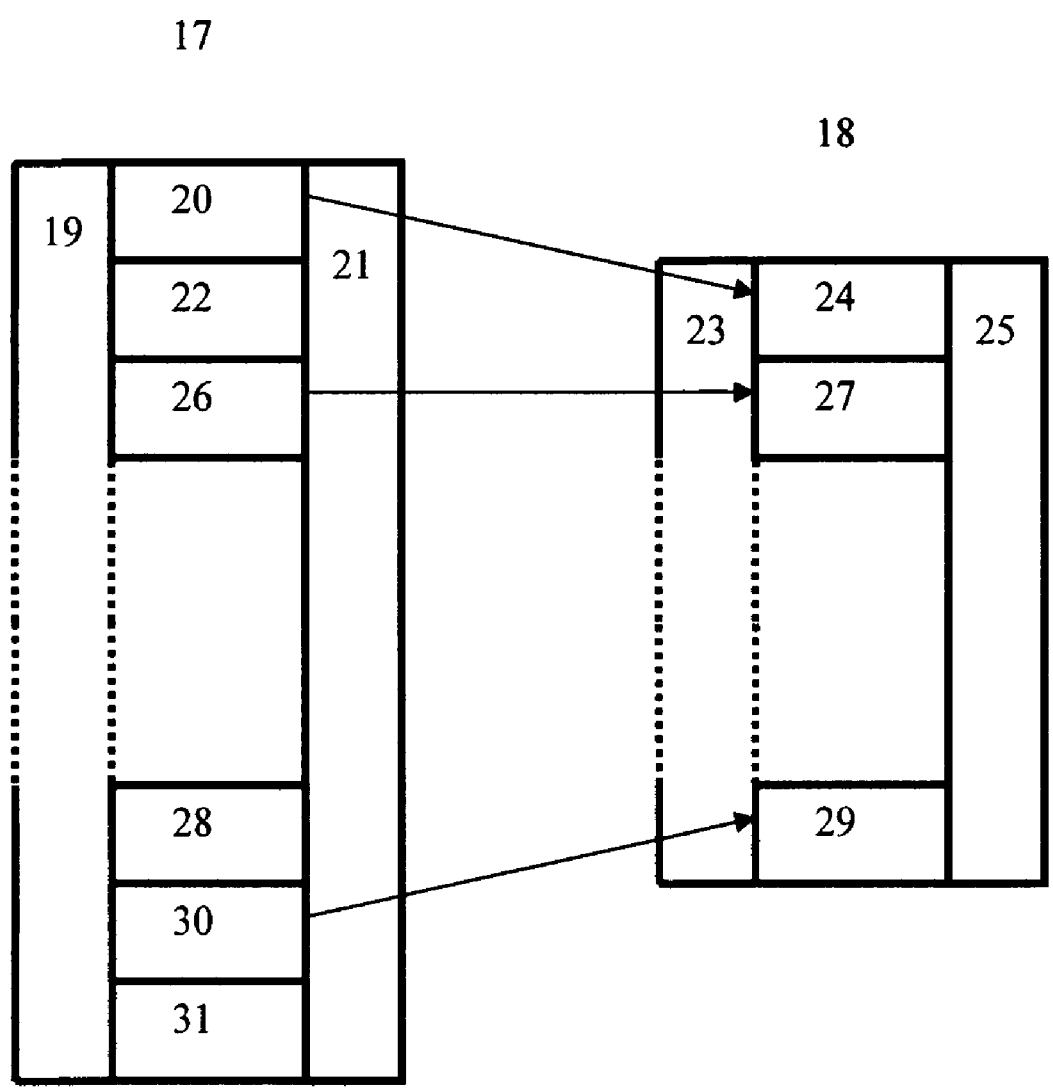

FIG. 2 represents simplified diagram of general purpose registers of processor with all registers (block 17) and simplified diagram of registers of the same processor with some registers excluded (block 18).

Block 17 (full set of registers) consists of write decoder 19, read multiplexer 21 and registers 20, 22, 26, ..., 28, 30, 31.
Block 18 (subset of registers) consists of write decoder 23, read multiplexer 25 and registers 24, 27, ..., 29.

Invented processor's architecture allows to exclude unused registers and associated with them blocks in write decoder and read multiplexer. In example FIG. 2 correspondence of the registers is

| | | |
|---|---|---|
| 20 | > | 24 |
| 22 | > | excluded |
| 26 | > | 27 |
| ... | | |
| 28 | > | excluded |
| 30 | > | 29 |
| 31 | > | excluded |

FIG. 2 depicts how exclusion of unused registers 22, 28, 31 diminishes the size of processor and makes it faster because:

write decoder 19 is smaller than write decoder 21 because it serves lesser number of registers. For that reason write decoder 21 has less area and less timing delays than write decoder 19 for all registers;

read multiplexer 23 is smaller than read multiplexer 25 because it combines lesser number of registers. For this reason read multiplexer 25 has less area and less timing delays than read multiplexer 23 for all registers;

combined area of the registers 24, 27, ..., 29 in block 18 is less than combined area of all registers 20, 22, 26, ..., 28, 30, 31 in block 17.

FIG. 2 may also be applied to interrupt registers, exception registers, testability registers in similar way as to general purpose registers.

Figure 3:
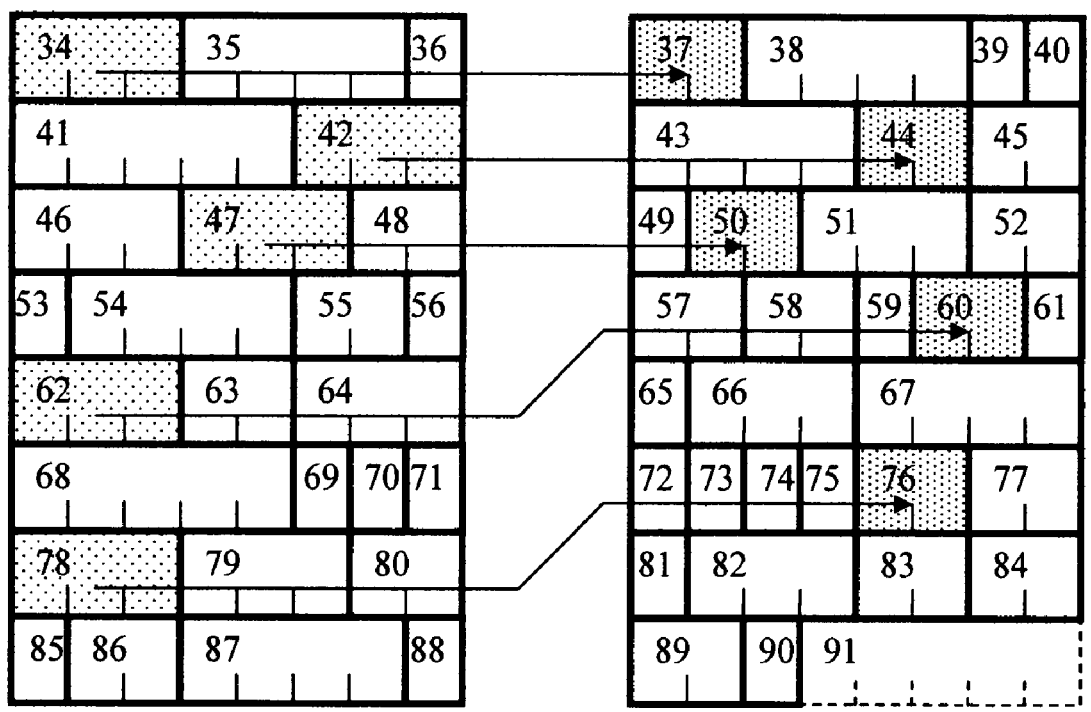

FIG. 3 depicts a program arrangement 32 in memory and arrangement 33 of the same program in the same memory after exclusion of portion of instruction. Invented processor's architecture allows to exclude portion of instruction when it is not used by a program without alteration in algorithm behavior. It diminishes the portion of memory occupied by program.

For example, instruction of type A is used in program five times as 34, 42, 47, 62, 78 (grayed on FIG. 3 in program arrangement 32). Instruction type A has length of three bytes. If one of the bytes of instruction is not used by application program the length of instruction may be shortened to two bytes by means of exclusion of portion of instruction. The respective two byte instructions of the modified type A' are 37, 44, 50, 60, 76 (grayed on FIG. 3 in program arrangement 33). Exclusion of portion of instruction results in freed space 91 of five bytes in memory arrangement 33.

In FIG. 3 correspondence of instructions is next:

| | | | |
|---|---|---|---|
| 34 | > | 37 | diminished |
| 35 | > | 38 | |
| 36 | > | 39 | |
| 41 | > | 40 & 43 | |
| 42 | > | 44 | diminished |
| 46 | > | 45 & 49 | |
| 47 | > | 50 | diminished |
| 48 & 53 | > | 51 | |
| 54 | > | 52 & 57 | |
| 55 | > | 58 | |
| 56 | > | 59 | |
| 62 | > | 60 | diminished |
| 63 | > | 61 & 65 | |
| 64 | > | 66 | |
| 68 | > | 67 & 72 | |
| 69 | > | 73 | |
| 70 | > | 74 | |
| 71 | > | 75 | |
| 78 | > | 76 | diminished |
| 79 | > | 77 & 81 | |
| 80 & 85 | > | 82 | |
| 86 | > | 83 | |
| 87 | > | 84 & 89 | |
| 88 | > | 90 | |

Ampersand sign "&" is used to reflect the case when instruction crosses the boundary of memory width which is eight bytes as an example in FIG. 3.

Figure 4:
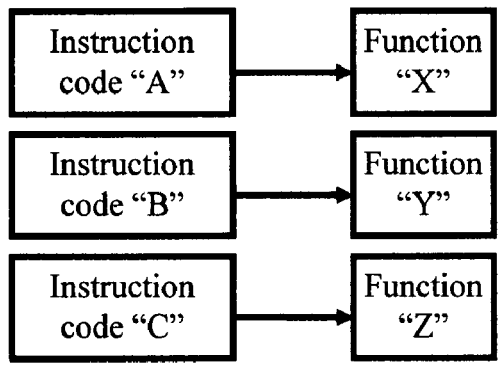
Figure 4:
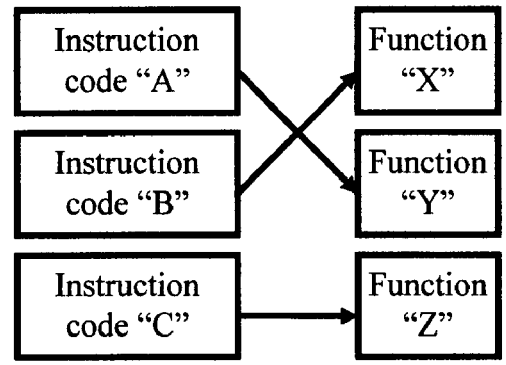
Figure 4:
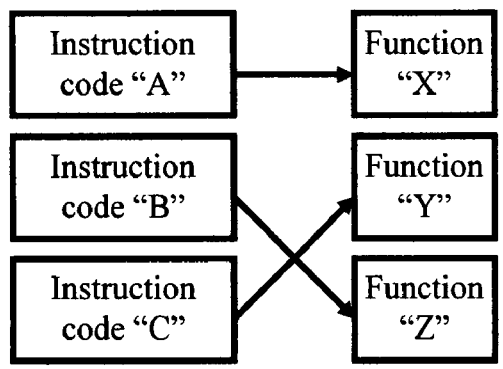
Figure 4:
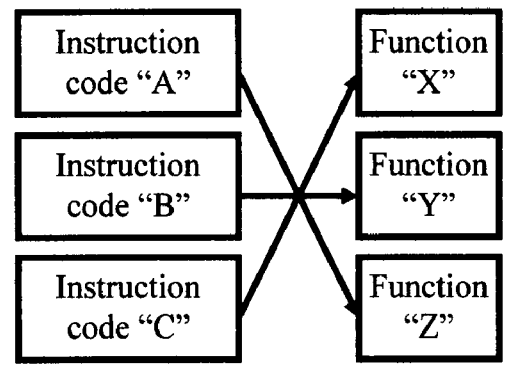
Figure 4:
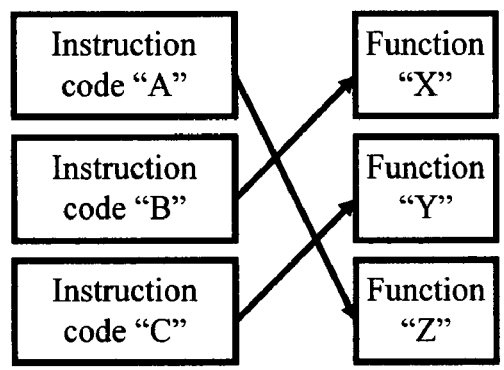
Figure 4:
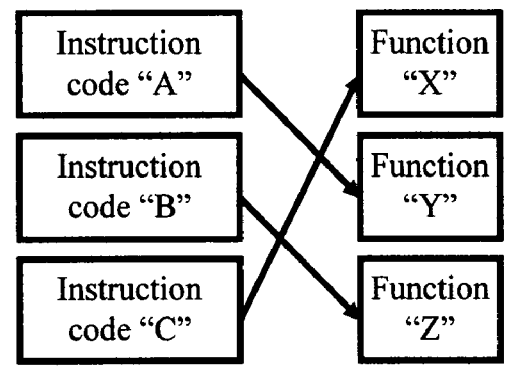

FIG. 4 illustrates different associations between instruction codes and processor's function. The example assumes presence of three functions in processor "X", "Y", "Z" which could be for instance addition, multiplication and jump. Three functions require three instruction codes "A", "B", "C".

There are 3!=6 different associations between processor's functions and instructions codes, namely:

| | | | |
|---|---|---|---|
| "ABC" | > | "XYZ" | (item 92 on FIG. 4) |
| "ABC" | > | "YXZ" | (item 93 on FIG. 4) |
| "ABC" | > | "XZY" | (item 94 on FIG. 4) |
| "ABC" | > | "ZYX" | (item 95 on FIG. 4) |
| "ABC" | > | "ZXY" | (item 96 on FIG. 4) |
| "ABC" | > | "YZX" | (item 97 on FIG. 4) |

In general case, if number of instructions is n they may be associated (rearranged) with n processor's functions by $n!=1*2*3* \ldots *(n-1)*n$ ways.

For n=256, $256! \cong 8.578*10506$.

Invented architecture of processor may change association between instruction codes and processor's functions. Due to big number of association for n>10 there is a negligible chance $(n!)^{-1}$ for outsider (including a program virus developer) to know which variant of association is used by insider.

Consider a program consisting of three instruction in next order

A=addition

B=multiplication

C=jump

Depending on instruction code association with processor's functions the program will be executed as follows:

addition, multiplication, jump (case 92 on FIG. 4)

or multiplication, addition, jump (case 93 on FIG. 4)

or addition, jump, multiplication (case 94 on FIG. 4)

or jump, multiplication, addition (case 95 on FIG. 4)

or jump, addition, multiplication (case 96 on FIG. 4)

or multiplication, jump, addition (case 97 on FIG. 4)

Only one variant of association provides a correct program execution (for example, case 92 on FIG. 4) because instructions are not commutative. Different order of execution gives different result.

DETAILED DESCRIPTION OF THE INVENTION

The invention provides an architecture of digital processor which allows to protect computer from execution of program viruses. It is made by a change of association between instruction set coding and processor functions.

For example, addition of two registers ADD Ri,Rj is associated with instruction code 0x10 in original instruction set and after its alteration the same function ADD Ri,Rj will be associated with instruction code 0x85.

User programs need to be translated or recompiled in order to execute addition ADD as new code 0x85 while outsider's software (including viruses) will continue to apply code 0x10 to perform an addition ADD. In new altered instruction set the former code 0x10 may be excluded completely from instruction set or reused for a function different from addition. When excluded instruction code is executed on invented processor, an exception occurs. Thus a virus or outsider's program is aborted.

Invented processor architecture may utilize a table based on ROM (read only memory), RAM (random access memory, writable memory) or PLM (programmable logic matrix) implementation. ROM, RAM or PLM is inserted between fetched from memory instruction output ("vmig_av_fetched_instr" in file "gnig_cpu.v") and processor's instruction decoder input ("vmig_av_basic_instr" in file "vmig_cpu.v"). Fetched from memory instruction will be converted to a basic instruction by a table of association containing in a ROM, RAM or PLM. For above example, an instruction code 0x85 will be mapped to instruction code 0x10.

Instruction set coding may be changed dynamically (multiple times) in case of RAM or EEPROM usage for table implementation. ROM or PLM allows to change instruction code association with processor's functions ones and PLM has a smaller size advantage in respect to ROM especially when some instructions are excluded.

Instruction set coding may also be altered by direct change of values of constants defining instruction codes and full synthesis of the processor. It is suitable for FPGA (Filed Programmable Gate Arrays) based implementations of processor.

To keep existing on user's computer software as executable by processor with altered instruction set coding, the software should be translated to newly chosen instruction set coding by simple converter program (for above example it should convert instruction code 0x10 into 0x85). It is required to make this conversion only ones before instruction coding change.

Additionally, the present invention provides an architecture of digital processor which allows to exclude instruction from processor's instruction set, portions of instructions and registers which are not used by program.

Process of exclusion may be described as follows: Program compiler developed for invented processor provides information about unused instruction, unused portions of instructions, unused general purpose registers, unused interrupts, unused exceptions, unused direct memory access, unused testability features and information about required memory address width, width of program counter, stack pointer, input/output address width and input/output data width.

This information is stored in the intermittent file "vmig.h". The architecture of processor with excludable instructions and registers and changeable instruction coding is implemented on hardware description language in file "vmig_cpu.v" with conditional statements which are controlled by parameters stored in intermittent file "vmig.h".

Actual exclusion of processor's blocks happens on stage of synthesis of processor from hardware description language representation "vmig_cpu.v" into gate level format. The intermittent file "vmig.h" containing information to synthesize or not to synthesize particular blocks. Intermittent file may be altered by user to allow to retain instructions and registers excluded by compiler.

For example, assembler compiler developed for invented processor determines that user's program never calls for 8 bit addition of two registers (instruction ADD8_8_RR). As result parameter ADD8_8_RR_YES won't be defined in the intermittent file.
//`define ADD8_8_RR_YES A physical portion of instruction decoder associated with instruction ADD8_8_RR won't be synthesized because conditional compilation checks for definition of parameter ADD8_8_RR_YES (see below).

```
`ifdef ADD8_8_RR_YES
    ADD8_8_RR:
        begin
            ni_len = 'd3;
            ni_wait_num = 'd1;
            unk_instr = 1'b0;
        end
`endif
```

Similar approach is made for exclusion of unused by user's program registers. If parameter RR09_YES is not defined in intermittent file //`define RR09_YES
the register RR09 won't be synthesized including all internal functionalities for register RR09 (see below). If parameter RR09_YES is defined the register RR09 will be synthesized with different variants depending on necessity in interrupts (parameter MCU_IRQ_YES) and in auto increments (parameter RRINC_YES).

```
`ifdef RR09_YES
  `ifdef MCU_IRQ_YES
      rr09 <= (rr_restore) ? rrb09 :
    `ifdef RRINC_YES
        (rr09_second_source_update) ? rr_second_source_next[15:8] :
    `endif
        (rr09_dest_update) ? rr_dest_in[79:72] : rr09;
      rrb09 <= (rr_store) ? rr09 : rrb09;
  `else
      rr09 <=
    `ifdef RRINC_YES
        (rr09_second_source_update) ? rr_second_source_next[15:8] :
    `endif
        (rr09_dest_update) ? rr_dest_in[79:72] : rr09;
  `endif
`endif
```

I claim:
1. A system for protection against program viruses comprising:
    a memory storing more than one and up to $2^n!$ variants of instruction set coding, wherein each variant of instruction set coding is a table of $2^n$ integer numbers assigned to $2^n$ processor's functions and wherein n is greater than 1 number of bits in the instruction set coding;
    a variant of instruction set coding is randomly chosen from the variants of instruction set coding stored in the memory; and
    a processor executing a program only if the program has been compiled with instruction set codes matching to the randomly chosen variant of instruction set coding to prevent an execution of the program viruses.

* * * * *